(12) United States Patent  (10) Patent No.: US 8,752,833 B2
Umi et al.  (45) Date of Patent: Jun. 17, 2014

(54) PAPER CONVEYANCE APPARATUS

(71) Applicant: PFU Limited, Kahoku (JP)

(72) Inventors: Takayuki Umi, Kahoku (JP); Masanobu Hongo, Kahoku (JP)

(73) Assignee: PFU Limited, Kahoku-shi (JP)

( * ) Notice: Subject to any disclaimer, the term of this patent is extended or adjusted under 35 U.S.C. 154(b) by 0 days.

(21) Appl. No.: 13/966,830

(22) Filed: Aug. 14, 2013

(65) Prior Publication Data

US 2014/0077449 A1 Mar. 20, 2014

(30) Foreign Application Priority Data

Sep. 14, 2012 (JP) ................... 2012-202963

(51) Int. Cl.
 B65H 7/02 (2006.01)
(52) U.S. Cl.
 USPC .................................. 271/265.01; 271/258.01
(58) Field of Classification Search
 CPC ...................... B65H 2511/51; B65H 2511/528; G03G 15/70; G03G 2215/00548
 USPC ........................... 271/265.01, 258.01; 399/21
 See application file for complete search history.

(56) References Cited

U.S. PATENT DOCUMENTS

2012/0235929 A1 9/2012 Hongo et al.

FOREIGN PATENT DOCUMENTS

| JP | S57-169767 | 10/1982 |
| JP | H07-14793 | 3/1995 |
| JP | 2001-188926 | 7/2001 |

OTHER PUBLICATIONS

Office action mailed Jul. 9, 2013 in corresponding JP 2012-202963 including English translation, 5pp.

Primary Examiner — Michael McCullough
(74) Attorney, Agent, or Firm — Christie, Parker & Hale, LLP

(57) ABSTRACT

A paper conveyance apparatus including a housing, a guide member for guiding a paper conveyed in a paper conveyance path, the guide member being attached to the housing, a sound signal generator for generating a sound signal in response to a sound detected through a sound receiving aperture disposed in a space between the housing and the guide member, and a vent path for cleaning the sound receiving aperture by an air blow to the sound receiving aperture, the vent path communicating with the interior and exterior of the space between the housing and the guide member.

7 Claims, 15 Drawing Sheets

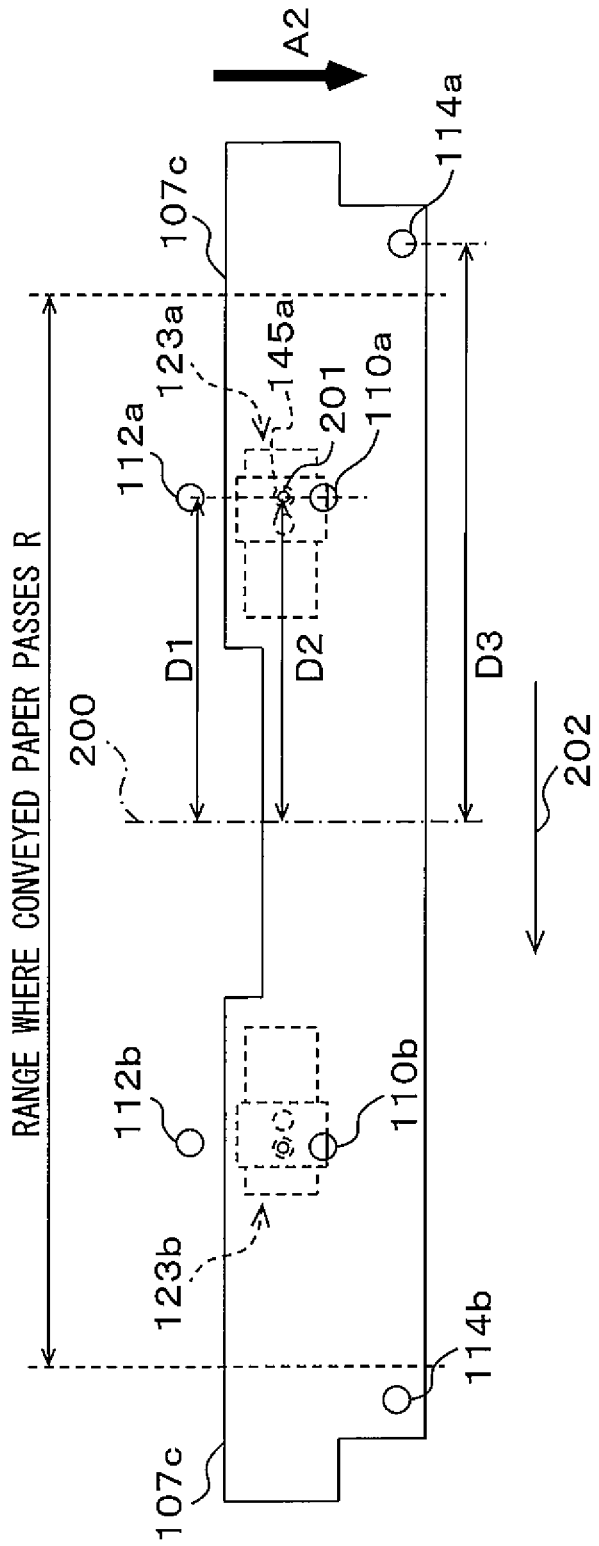

PAPER CONVEYANCE APPARATUS

CROSS-REFERENCE TO RELATED APPLICATIONS

This application is based upon and claims the benefit of priority of prior Japanese Patent Application No. 2012-202963, filed on Sep. 14, 2012, the entire contents of which are incorporated herein by reference.

TECHNICAL FIELD

Embodiments illustrated herein relate to a paper conveyance apparatus, and, in particular, to a paper conveyance apparatus including a sensor that detects a sound generated in a conveyance path.

BACKGROUND

In a paper conveyance apparatus provided in an apparatus such as an image reading apparatus and an image copying apparatus, a jam occurs in some cases when a paper moves in a conveyance path. Some paper conveyance apparatuses include a function for determining whether a jam has occurred based on whether a paper has been conveyed to a predetermined position in a conveying path within a predetermined period of time after initiation of conveyance of the paper to stop an operation of the apparatus when a jam has occurred.

As a technique relating to jam detection, a jam detection apparatus of a copier including an acoustic electric signal conversion unit disposed in the vicinity of a sheet conveyance path, a level detector that compares an output of the acoustic electric signal conversion unit with a baseline level to generate a pulse signal while the output exceeds the baseline level, and a pulse width detector that compares a duration of a pulse signal from the level detector with a reference value is known.

Related art is disclosed in Japanese Laid-open Patent Publication No. 57-169767.

SUMMARY

When a jam occurs a large sound is generated in a conveyance path. Therefore, when a sensor for detecting a sound generated in the conveyance path is provided, jam occurrence may be detected. However, when foreign matter such as paper powder and dust adhere to or intrude into the sensor, a failure of the sensor and sensitivity degradation may occur.

An object of an apparatus illustrated herein is to reduce adhesion of foreign matters to and intrusion thereof into a sensor that detects a sound generated in a conveyance path.

In accordance with an aspect of the embodiment, there is provided a paper conveyance apparatus including a housing, a guide member for guiding a paper conveyed in a paper conveyance path, the guide member being attached to the housing, a sound signal generator for generating a sound signal in response to a sound detected through a sound receiving aperture disposed in a space between the housing and the guide member, and a vent path for cleaning the sound receiving aperture by an air blow to the sound receiving aperture, the vent path communicating with the interior and exterior of the space between the housing and the guide member.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 8 is a schematic view of a state prior to cleaning a vicinity of a first microphone 123a.

FIG. 9 is a schematic view of one example of a state at the time of cleaning a vicinity of the first microphone 123a.

FIG. 10 is a schematic view of another example of a state at the time of cleaning a vicinity of the first microphone 123a.

FIG. 11 is a view for illustrating an example of an arrangement position of an aperture 110a.

FIG. 13A is a view for illustrating an example of an arrangement position of an exhaust opening 114a.

FIG. 13B is a view for illustrating an example of an arrangement position of the exhaust opening 114a.

DESCRIPTION OF EMBODIMENTS

The paper conveyance apparatus according to one aspect of this application will now be described with reference to the drawings. However, note that the technical scope of this application is not limited to these embodiments and extends to the inventions described in appended claims and their equivalents.

Figure 1:
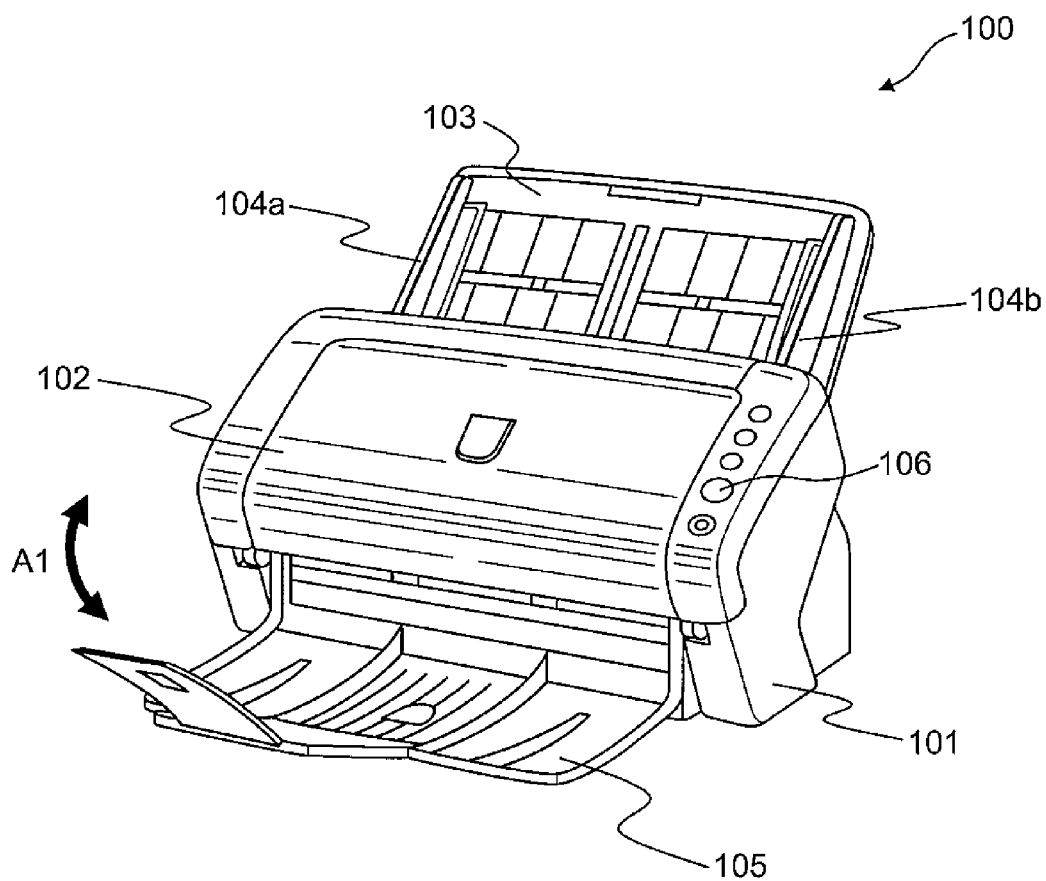
FIG. 1 is a perspective view illustrating a paper conveyance apparatus 100.

FIG. 1 is a perspective view illustrating a paper conveyance apparatus 100 configured as an image scanner. The paper conveyance apparatus 100 includes a lower housing 101, an upper housing 102, a paper table 103, a discharging table 105, and an operation button 106.

The lower housing 101 and the upper housing 102 are formed with a resin material. The upper housing 102 is disposed in a position covering an upper face of the paper conveyance apparatus 100, and engaged with the lower housing 101 using a hinge so as to be openable and closable at the time of jam occurrence of a paper and of cleaning inside the paper conveyance apparatus 100.

The paper table 103 is engaged with the lower housing 101 so as to place a paper thereon. The paper table 103 includes side guides 104a and 104b movable in a direction at right angles to a conveyance direction of a paper, i.e., in horizontal direction with respect to the conveyance direction of a paper. The side guides 104a and 104b are positioned to fit a width of a paper so that a width direction of the paper can be regulated.

The discharging table 105 is engaged rotatably with the lower housing 101 using a hinge in a direction as illustrated by an arrow A1 and can hold discharged papers while being opened as illustrated in FIG. 1. The operation button 106 is disposed on a surface of the upper housing 102 to produce and output an operation detection signal when pressed down.

Figure 2:
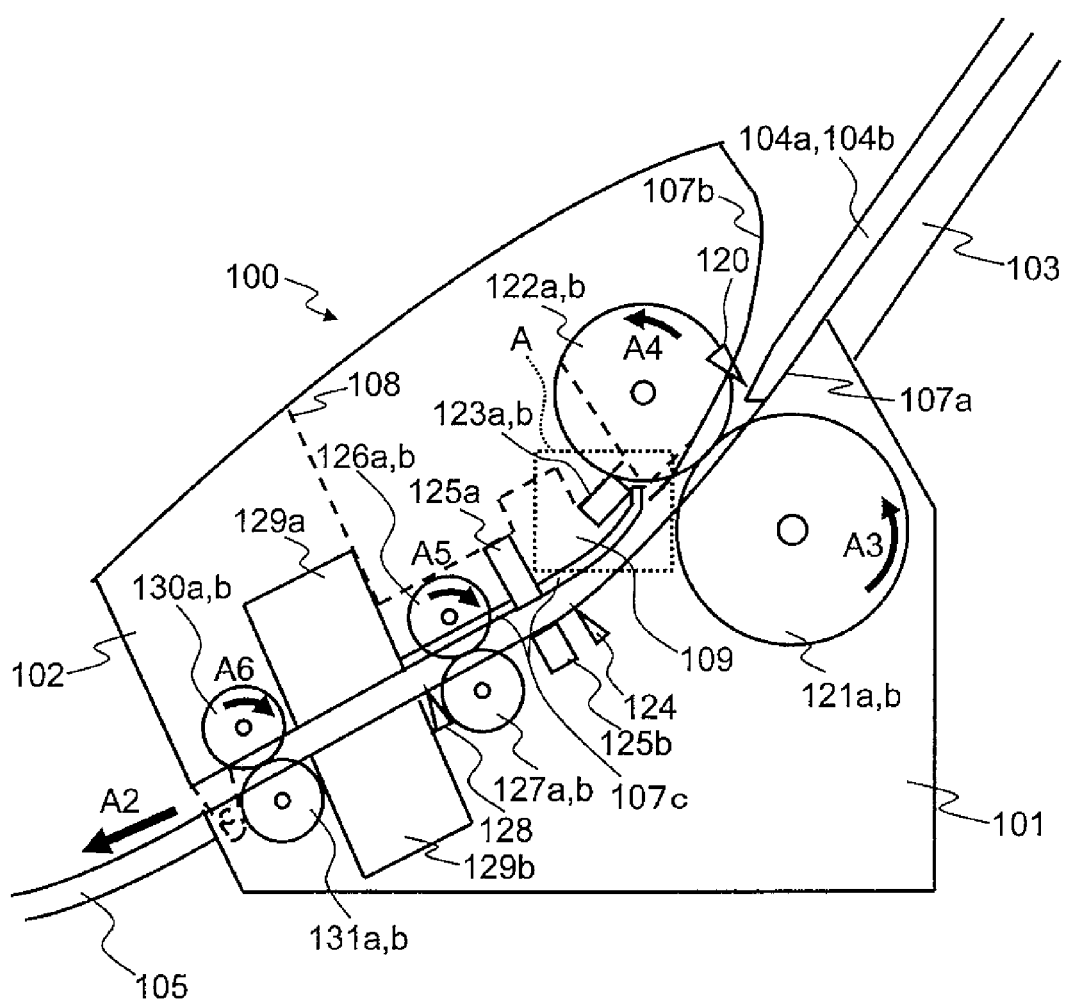
FIG. 2 is a view for illustrating a conveyance path inside the paper conveyance apparatus 100.

FIG. 2 is a view for illustrating a conveyance path inside the paper conveyance apparatus 100. In the conveyance path inside the paper conveyance apparatus 100, a first paper detector 120, sheet feeding rollers 121a and 121b, retard rollers 122a and 122b, a first microphone 123a, a second microphone 123b, and a second paper detector 124 are disposed. Further, in the conveyance path inside the paper conveyance apparatus 100, an ultrasound transmitter 125a, an ultrasound receiver 125b, first conveyance rollers 126a and 126b, first driven rollers 127a and 127b, a third paper detector 128, a first imaging unit 129a, and a second imaging unit 129b are disposed. Further, in the conveyance path inside the paper conveyance apparatus 100, second conveyance rollers 130a and 130b and second driven rollers 131a and 131b are disposed.

Hereinafter, in some cases, the sheet feeding rollers 121a and 121b are collectively referred to as a sheet feeding roller 121, the retard rollers 122a and 122b are collectively referred to as a retard roller 122, and the first conveyance rollers 126a and 126b are collectively referred to as a first conveyance roller 126. Also, in some cases, the first driven rollers 127a and 127b are collectively referred to as a first driven roller 127, the second conveyance rollers 130a and 130b are collectively referred to as a second conveyance roller 130, and the second driven rollers 131a and 131b are collectively referred to as a second driven roller 131.

An upper face of the lower housing 101 forms a lower guide 107a of the conveyance path of a paper, and a lower face of the upper housing 102 forms an upper guide 107b of the conveyance path of a paper. An arrow A2 in FIG. 2 indicates the conveyance direction of a paper. Hereinafter, an upstream refers to an upstream of the conveyance direction A2 of a paper, and a downstream refers to a downstream of the conveyance direction A2 of a paper.

The first paper detector 120 includes a contact detection sensor disposed on an upstream side of the sheet feeding roller 121 and the retard roller 122 to detect whether or not a paper is placed on the paper table 103. The first paper detector 120 produces and outputs a first paper detection signal having a signal value that changes depending on whether a paper is placed on the paper table 103.

The first microphone 123a and the second microphone 123b each detect a sound generated during conveyance of a paper to output an analog signal produced from a detected sound. The first microphone 123a and the second microphone 123b are fixed to a frame 108 inside the upper housing 102 formed by shaping the upper housing 102. An arrangement position of the first microphone 123a and the second microphone 123b may be, for example, a downstream side of the sheet feeding roller 121 and the retard roller 122.

Between the first microphone 123a and the conveyance path, and between the second microphone 123b and the conveyance path, a guide member 107c functioning as an upper guide of the conveyance path is disposed. In other words, the first microphone 123a and the second microphone 123b are disposed inside a space 109 surrounded by the frame 108 and the guide member 107c.

The second paper detector 124 has a contact detection sensor disposed on a downstream side of the sheet feeding roller 121 and the retard roller 122, and also on an upstream side of the first conveyance roller 126 and the first driven roller 127 to detect whether or not a paper is present at a position of the sensor. The second paper detector 124 produces and outputs a second paper detection signal having a signal value that changes depending on whether a paper is present at a position of the detector.

The ultrasound transmitter 125a and the ultrasound receiver 125b are an example of an ultrasound signal output unit, and are disposed in the vicinity of the conveyance path of a paper so as to face each other across the conveyance path. The ultrasound transmitter 125a transmits an ultrasound. On the other hand, the ultrasound receiver 125b detects an ultrasound transmitted by the ultrasound transmitter 125a and passed through a paper to produce and output an ultrasound signal, which is an electric signal in response to ultrasound detected. Hereinafter, the ultrasound transmitter 125a and the ultrasound receiver 125b may also collectively be referred to as an ultrasound sensor 125.

The third paper detector 128 has a contact detection sensor disposed on a downstream side of the first conveyance roller 126 and the first driven roller 127, and also on an upstream side of the first imaging unit 129a and the second imaging unit 129b to detect whether or not a paper is present at a position of the sensor. The third paper detector 128 produces and outputs a third paper detection signal having a signal value that changes depending on whether a paper is present at a position of the detector.

The first imaging unit 129a has a CIS (Contact Image Sensor) of a same magnification optical type with an imaging device using a CMOS (Complementary Metal Oxide Semiconductor) linearly arrayed in a main scanning direction. This CIS produces and outputs an analog image signal by reading a back side of a paper. In the same manner, the second imaging unit 129b has a CIS of a same magnification optical type with an imaging device using a CMOS linearly arrayed in the main scanning direction. This CIS produces and outputs an analog image signal by reading a front side of the paper. Herein, any one of the first imaging unit 129a and the second imaging unit 129b may be disposed to read only one side of the paper. Further, instead of the CIS, an image sensor of a reduction optical type with an imaging device using a CCD (Charge Coupled Device) may be used. Hereinafter, the first imaging unit 129a and the second imaging unit 129b may also collectively be referred to as an imaging unit 129.

An paper placed on the paper table 103 is conveyed toward the paper conveyance direction A2 between the lower guide 107a and the upper guide 107b via rotation of the sheet feeding roller 121 in a direction of an arrow A3 of FIG. 2. In the same manner, the paper is conveyed toward the paper conveyance direction A2 between the lower guide 107a and the guide member 107c.

The retard roller 122 rotates in a direction of an arrow A4 of FIG. 2 during conveyance of a paper. When a plurality of papers are placed on the paper table 103, only a paper in contact with the sheet feeding roller 121 among the papers placed on the paper table 103 is separated by an operation of the sheet feeding roller 121 and the retard roller 122. The conveyance of papers other than a separated paper is restricted. The sheet feeding roller 121 and the retard roller 122 function as a separation unit of a paper.

While being guided by the lower guide 107a, the upper guide 107b, and the guide member 107c, the paper is sent between the first conveyance roller 126 and the first driven roller 127. Then, the paper is sent between the first imaging unit 129a and the second imaging unit 129b via rotation of the first conveyance roller 126 in a direction of an arrow A5 of FIG. 2. Further, the paper read by the imaging unit 129 is discharged onto the discharging table 105 via rotation of the second conveyance roller 130 in a direction of an arrow A6 of FIG. 2.

Figure 3:
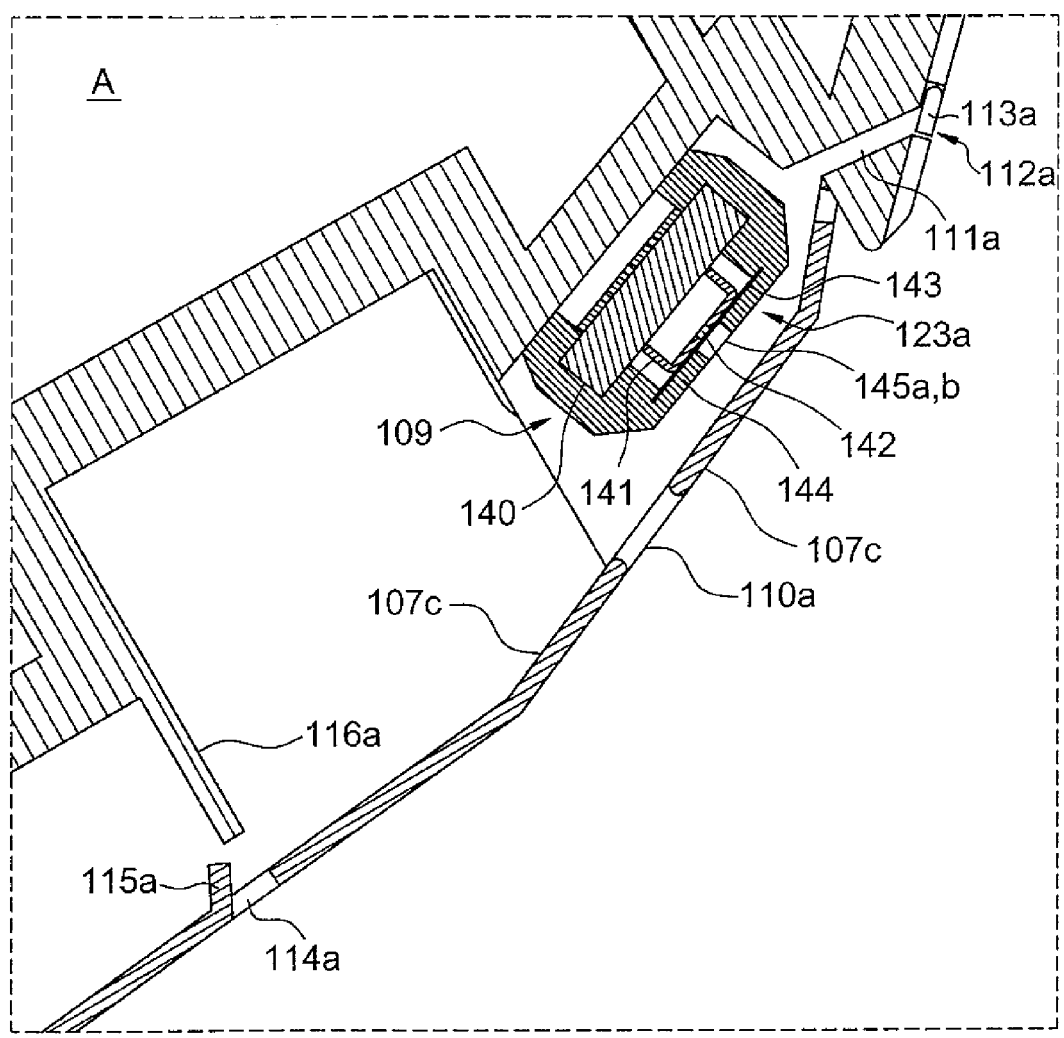
FIG. 3 is an enlarged view of the A portion of FIG. 2.

FIG. 3 is an enlarged view of the A portion of FIG. 2 where the first microphone 123a is disposed. The first microphone 123a and a structure of its periphery will be described below, and the second microphone 123b is the same as in this case.

The first microphone 123a includes a substrate 140 and a microphone device 141 electrically connected to this substrate 140. The microphone device 141 may be, for example, a MEMS (Micro Electro Mechanical System) microphone device or an electret condenser microphone (ECM) device. The microphone device 141 converts a received sound at a position of a sound aperture 142 disposed on a face opposite to a connection face with the substrate to an electric signal. The sound aperture 142 corresponds to a sound receiving aperture.

The first microphone 123a is fixed to the frame 108 of the upper housing 102, and a normal line of a face provided with the sound aperture 142 faces obliquely downward. Therefore, this reduces deposition of foreign matter on the sound aperture 142 and its periphery.

The face provided with the sound aperture 142 in the microphone device 141 has a woven cloth 143 so as to cover the sound aperture 142. The woven cloth 143 may be, for example, a cloth mesh having favorable air permeability. The woven cloth 143 has a role as a dust preventive member to reduce the intrusion of foreign matter into the microphone device 141. In another example, instead of the woven cloth 143, non-woven cloth is usable. However, use of the woven cloth 143 makes acoustic performance of the microphone device 141 more uniform than use of the non-woven cloth.

The first microphone 123a includes a cap member 144 for pressing the woven cloth 143 to the microphone device 141. A material of the cap member 144 may be, for example, silicone rubber. Upon assembling the first microphone 123a, the cap member 144 can be attached to the substrate 140 in two different directions. The cap member 144 has two through-apertures 145a and 145b. Even when the cap member 144 is attached to the substrate 140 in any one of the two different directions, any one of the through-apertures 145a and 145b is aligned with the sound aperture 142. In the present example, the through-aperture 145a and the sound aperture 142 are aligned with each other.

The guide member 107c has a face facing the first microphone 123a. For easier detection of sound by the first microphone 123a, an aperture 110a is provided for the guide member 107c.

The aperture 110a provided for the guide member 107c is disposed in a position separate from a position of the first microphone 123a. For example, the aperture 110a is disposed in a position separate from a position of the sound aperture 142, i.e., the sound receiving aperture of the first microphone 123a. In the example of FIG. 3, the aperture 110a is disposed in a downstream of the conveyance direction from the position of the sound aperture 142.

When the positions of the aperture 110a and the first microphone 123a are displaced, foreign matter having entered from the aperture 110a may not reach the first microphone 123a. Further, at the time of cleaning by air ejection, breakage of the first microphone 123a due to direct application thereto with high-pressure air ejected to the aperture 110a can be prevented.

Further, foreign matter such as paper powder and dust entering from the aperture 110a are easily allowed to flow to a downstream of the aperture 110a by an air blow from upstream to downstream generated with conveyance of a paper in the conveyance path. When the aperture 110a is disposed in a downstream of the sound aperture 142 and the through-aperture 145a, adhesion and deposition of foreign matters to the sound aperture 142 and the through-aperture 145a can be reduced.

Further, while the upper housing 102 is closed, the guide member 107c is inclined to a horizontal plane. Therefore, on a face of the inside of the guide member 107c, i.e., on a face facing the first microphone 123a, foreign matter having entered from the aperture 110a are unlikely to be deposited.

In the space 109 between the frame 108 and the guide member 107c, where the first microphone 123a is disposed, a vent path 111a that communicates with the interior and exterior of the space 109 is disposed. A vent opening 112a that is an entrance outside the vent path 111a is disposed in an outer face of the upper housing 102. The vent opening 112a has a cover body 113a that is openable and closable.

When the paper conveyance apparatus 100 is cleaned, an air blow generated by high-pressure air ejected from a spray can and the like is sent into the space 109 from the vent opening 112a by opening the cover body 113a to blow away foreign matter in the vicinity of the sound aperture 142 and the through-aperture 145a. Cleaning of the paper conveyance apparatus 100 will be described later.

The guide member 107c has an exhaust opening 114a for exhausting an air blow sent in from the vent path 111a. The guide member 107c and the frame 108 may have flow regulators 115a and 116a for introducing an air blow sent in from the vent path 111a to the exhaust opening 114a.

Figure 4:
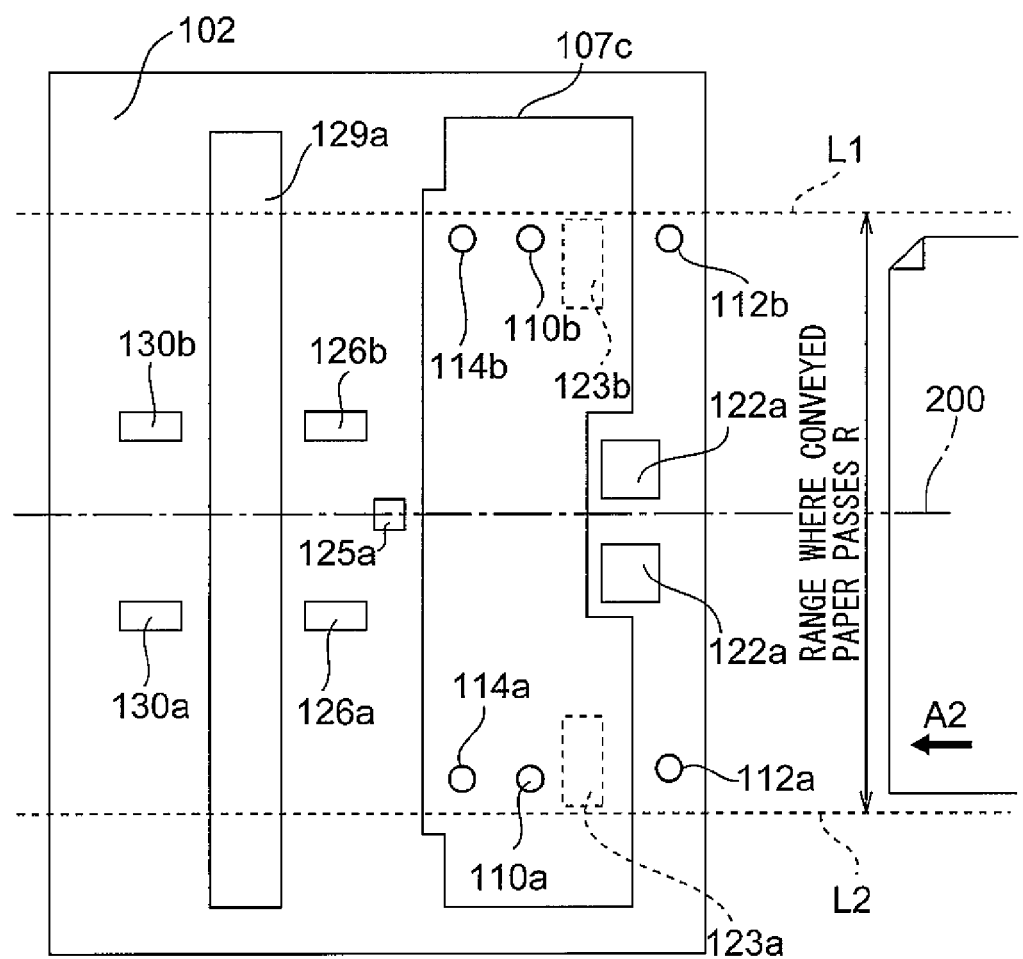
FIG. 4 is a view of seeing an upper housing 102 from below.

FIG. 4 is a view of the upper housing 102 seen from below. The first microphone 123a and the second microphone 123b are disposed in a position separate from the apparatus center 200 in a direction at right angles to the paper conveyance direction A2 across the apparatus center illustrated by a dashed-dotted line 200. On upstream sides of the first microphone 123a and the second microphone 123b, the vent openings 112a and 112b are disposed, respectively.

On a downstream side of the first microphone 123a, the aperture 110a and the exhaust opening 114a are disposed, and on a downstream side of the second microphone 123b, the aperture 110b and the exhaust opening 114b are disposed. Dashed lines L1 and L2 represent both edge positions of a width direction having a range R where a conveyed paper passes in the case of conveyance of a paper having a rated maximum width in the conveyance path. In the present example, the vent openings 112a and 112b, the apertures 110a and 110b, and the exhaust openings 114a and 114b are disposed inside the range R where a conveyed paper passes.

Figure 5:
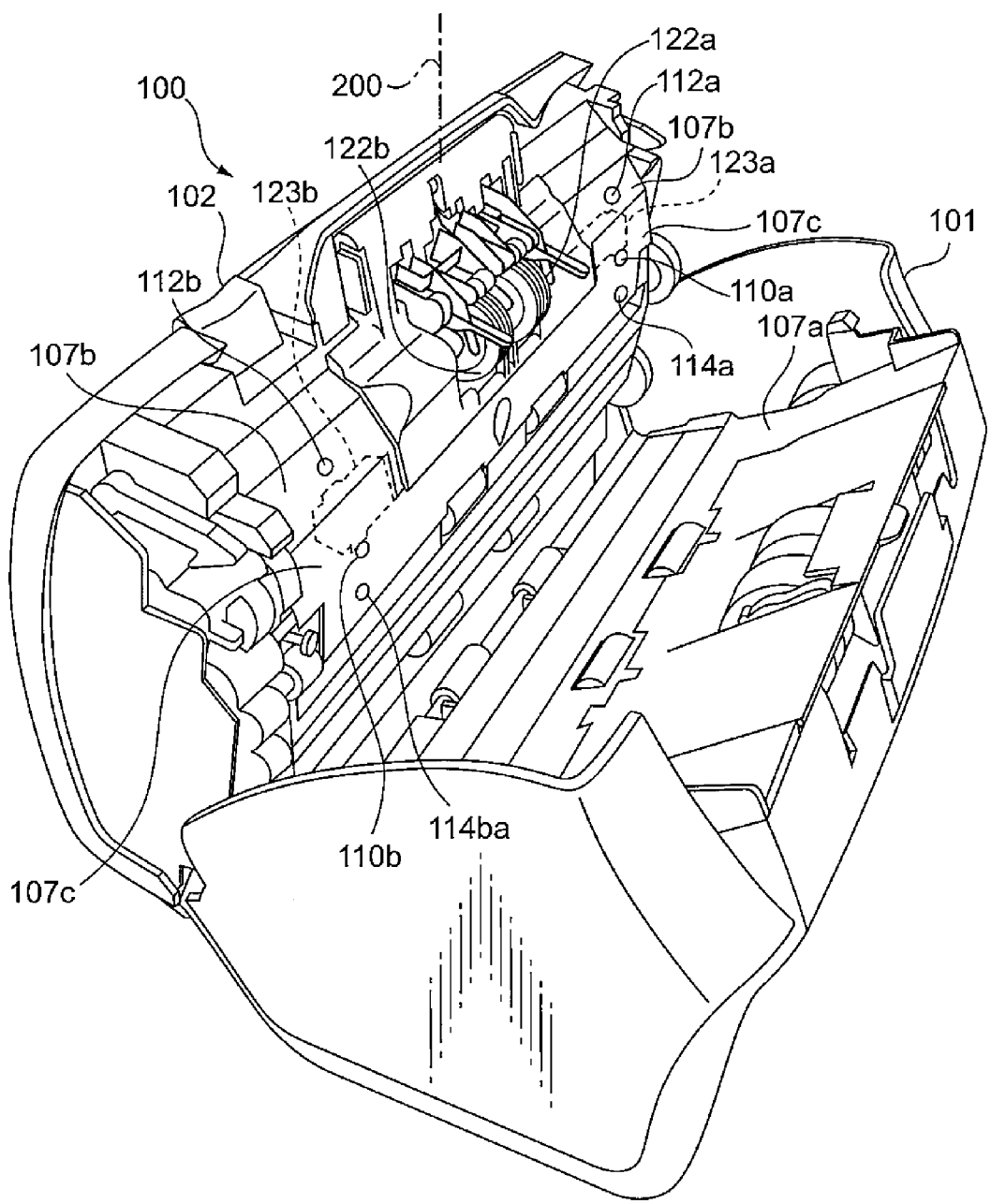
FIG. 5 is a perspective view of a state where the upper housing 102 is opened.
Figure 6:
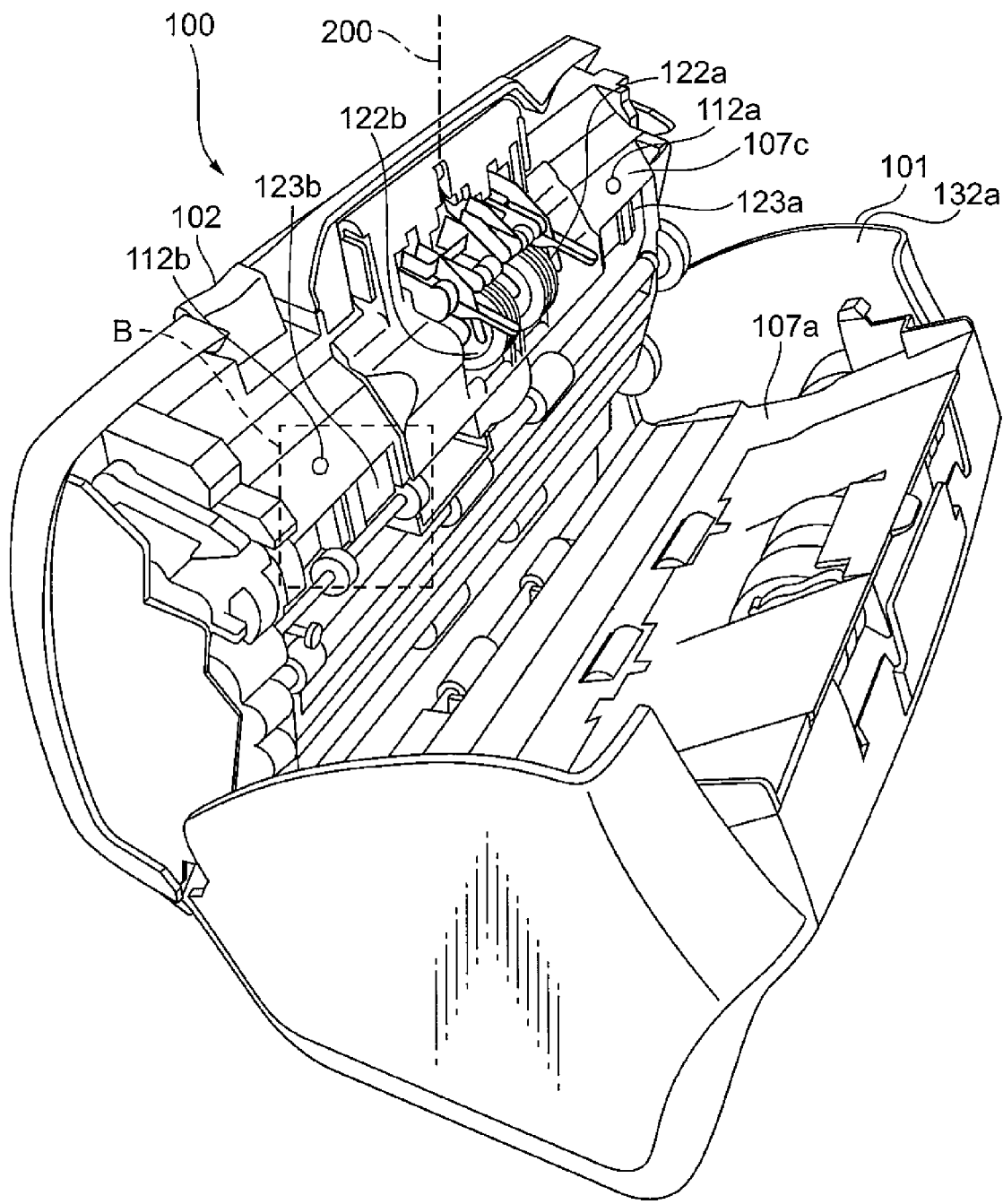
FIG. 6 is a perspective view of a state where the upper housing 102 is opened and a guide member 170c is removed.

FIG. 5 is a perspective view of a state where the upper housing 102 is opened, and FIG. 6 is a view illustrating a state where further, the guide member 170c is removed. Referring to FIG. 5 and FIG. 6, one example of a position for attaching the first microphone 123a and the second microphone 123b to the upper housing 102 will be described below. As described above, an upper face of the lower housing 101 forms the lower guide 107a of the conveyance path of a paper, and a lower face of the upper housing 102 forms the upper guide 107b of the conveyance path of a paper. Further, the guide member 107c is attached on a downstream side of the retard roller 122 to function as an upper guide of the conveyance path.

The first microphone 123a and the second microphone 123b are disposed in the back of the guide member 107c. In FIG. 5, the positions of the first microphone 123a and the second microphone 123b are illustrated by dashed lines. The positions of the vent openings 112a and 112b, the apertures 110a and 110b, and the exhaust openings 114a and 114b are illustrated by solid lines. When the guide member 107c is removed as illustrated in FIG. 6, the first microphone 123a and the second microphone 123b are exposed.

Figure 7:
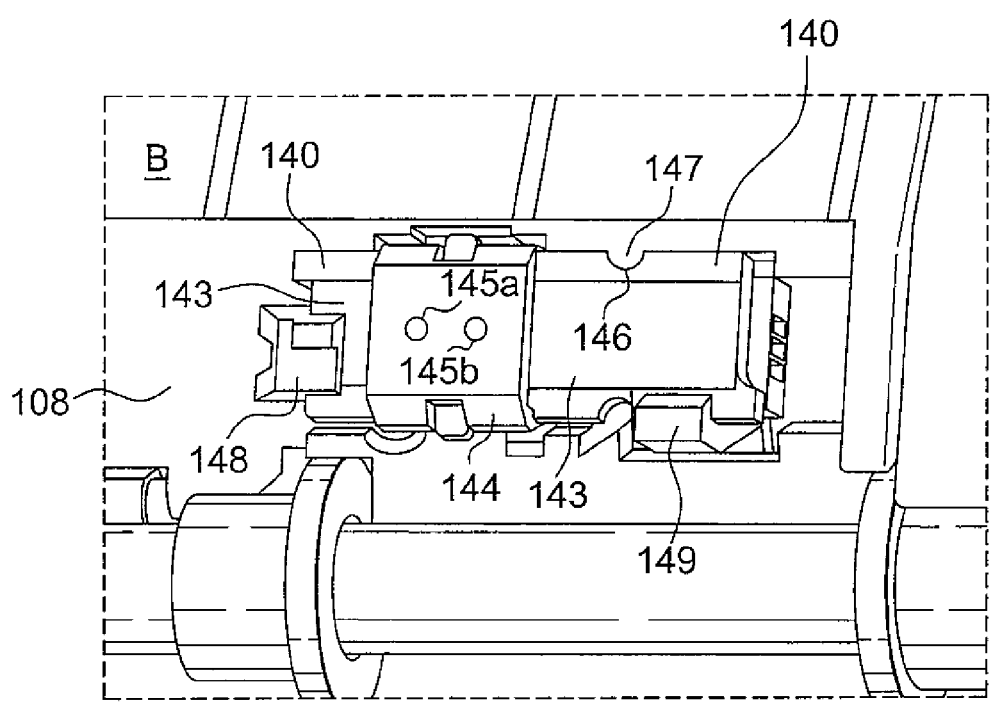
FIG. 7 is an enlarged view of the B portion of FIG. 6.

FIG. 7 is an enlarged view of the B portion of FIG. 5 where the first microphone 123a is attached. One example of a unit for fixing the first microphone 123a to the upper housing 102 will be described below.

The substrate 140 of the first microphone 123a has a notch 146 for positioning. On the other hand, the frame 108 inside the upper housing 102 has a protrusion 147 for positioning and nail parts 148 and 149. While the protrusion 147 is inserted in the notch 146, the substrate 140 is locked with the nail parts 148 and 149 to fix the first microphone 123a to the upper housing 102. The second microphone 123b may be fixed in the same manner.

Figure 8:
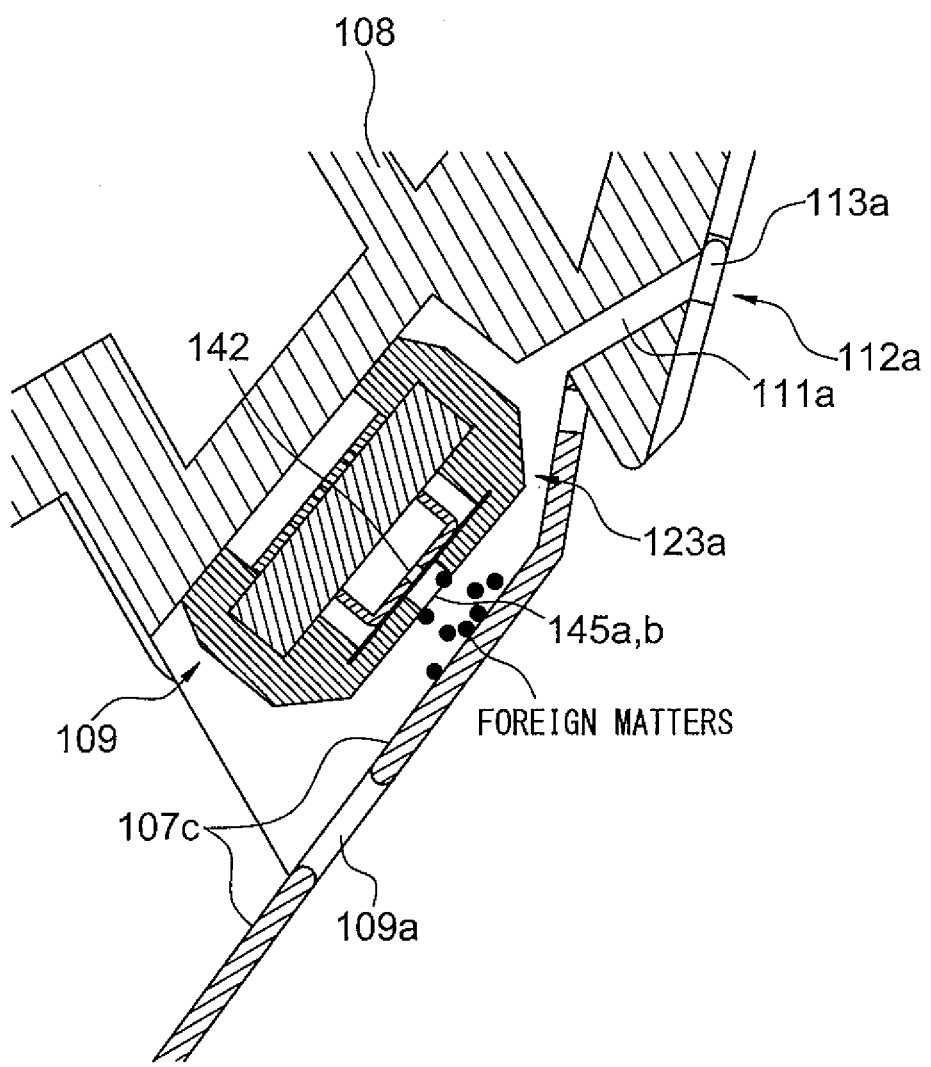

FIG. 8 is a schematic view of a state prior to cleaning a vicinity of the first microphone 123a. While the paper conveyance apparatus 100 is used, the vent opening 112a is closed by the cover body 113a. Foreign matter such as paper powder and dust having entered from the aperture 110a and other portions adhere to the sound aperture 142 and the through-aperture 145a.

Figure 9:
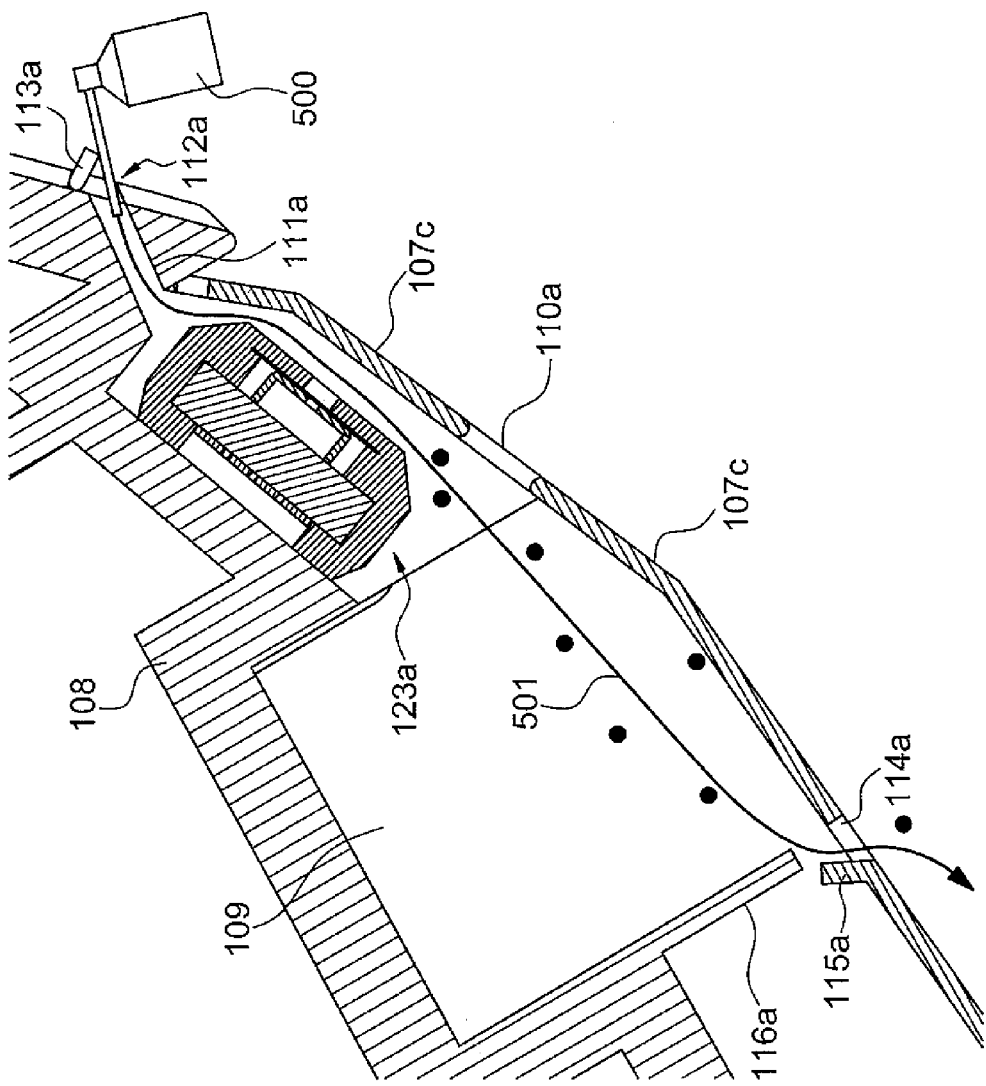

FIG. 9 is a schematic view of one example of a state at the time of cleaning a vicinity of the first microphone 123a. At the time of cleaning, the cover body 113a is opened and then an air blow 501 generated by high-pressure air ejected from a spray can 500 and the like is sent in from the vent opening 112a. The air blow 501 passes through the vent path 111a and reaches the first microphone 123a inside the space 109 to blow away foreign matters in the vicinity of the sound aperture 142 and the through-aperture 145a.

Foreign matter caused to flow by the air blow 501 sent in from the vent opening 112a are blown toward a downstream of the sound aperture 142 and the through-aperture 145a. Foreign matters inside the space 109 easily flow downstream by an air blow from upstream to downstream generated with conveyance of a paper in the conveyance path. Therefore, even when being caused to flow by conveyance of a paper in the conveyance path, foreign matters blown toward the downstream of the sound aperture 142 and the through-aperture 145a are unlikely to re-adhere to the sound aperture 142 and the through-aperture 145a which exist further upstream.

The air blow 501 sent in from the vent opening 112a passes through the exhaust opening 114a provided for the guide member 107c to be exhausted to the outside of the space 109. When the exhaust opening 114a is disposed in the downstream of the sound aperture 142 and the through-aperture 145a, foreign matter separated from the sound aperture 142 and the through-aperture 145a by the air blow 501 sent in from the vent opening 112a are easily discharged to the outside of the space 109.

Further, when the exhaust opening 114a is disposed in the downstream of the sound aperture 142 and the through-aperture 145a, foreign matter entering from the exhaust opening 114a are unlikely to adhere to or deposit on the sound aperture 142 and the through-aperture 145a.

In the present example, the exhaust opening 114a is disposed in a downstream of the aperture 110a. Therefore, even when adhering to a vicinity of the aperture 110a, foreign matter are separated from the aperture 110a by the air blow 501 sent in from the vent opening 112a and discharged to the outside of the space 109 through the exhaust opening 114a. Further, foreign matter entering from the exhaust opening 114a are also unlikely to adhere to or deposit on the vicinity of the aperture 110a. In this manner, adhesion of foreign matter to and deposition thereof on the vicinity of the aperture 110a provided for receipt of sound by the first microphone 123a are reduced.

Figure 10:
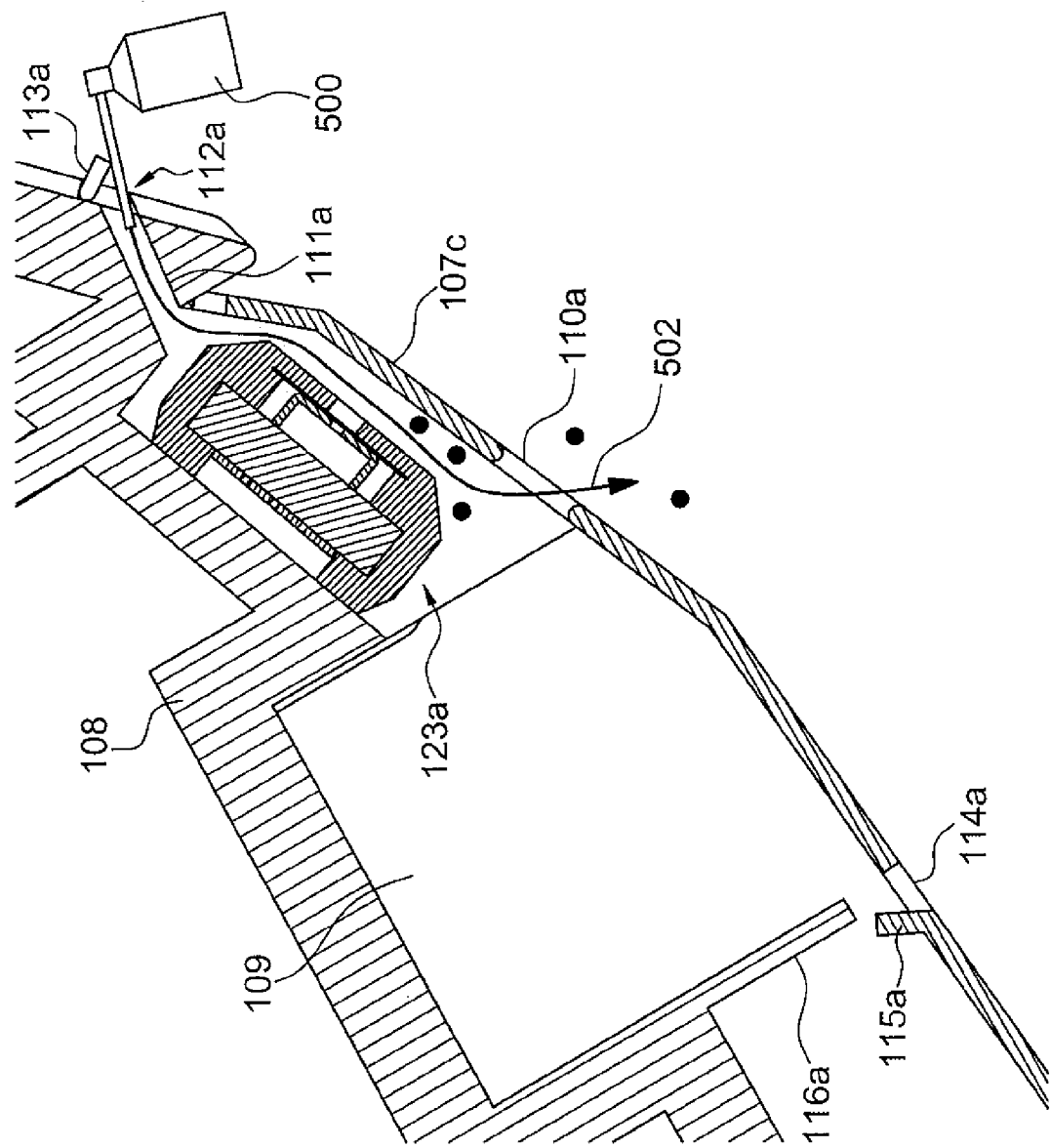

FIG. 10 is a schematic view of another example of a state at the time of cleaning a vicinity of the first microphone 123a. An air blow 502 sent in from the vent opening 112a may be exhausted from the aperture 110a to the outside of the space 109. Since the aperture 110a is disposed in a downstream of the sound aperture 142 and the through-aperture 145a, foreign matter separated from the sound aperture 142 and the through-aperture 145a by the air blow 502 can be discharged to the outside of the space 109 through the aperture 110a. When the aperture 110a is used for exhausting the air blow 502, the exhaust opening 114a may be omitted.

Figure 11:
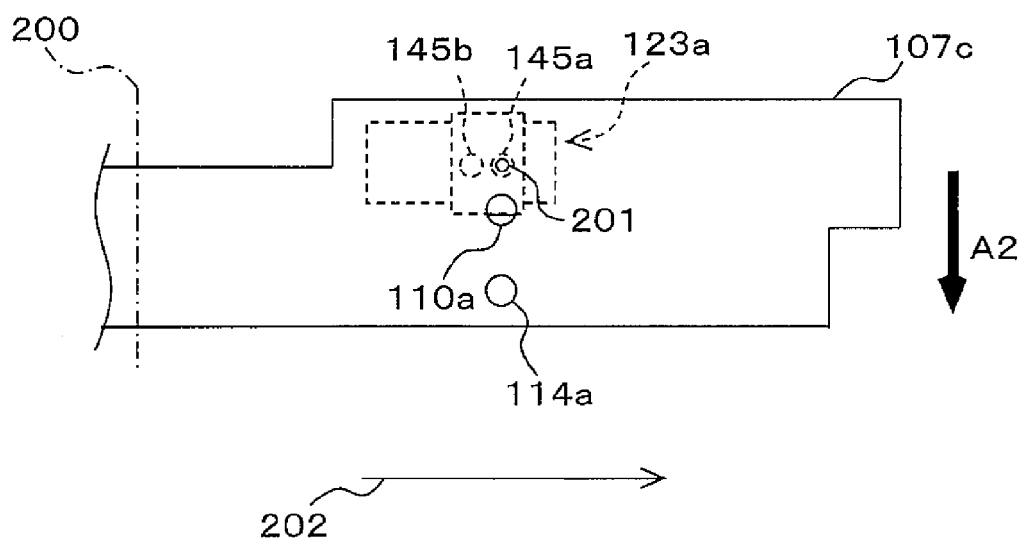

FIG. 11 is a view for illustrating an example of an arrangement position of the aperture 110a provided for the guide member 107c. A positional relationship between the first microphone 123a and the aperture 110a will be described below. However, a positional relationship between the second microphone 123b and the aperture 110b may be the same as above.

In a state where the first microphone 123a and the guide member 107c are attached to the upper housing 102, the positions of the first microphone 123a and the through-apertures 145a and 145b of the cap member 144 are illustrated by dashed lines. Herein, as described above, the sound aperture 142 provided for the microphone device 141 is aligned with the through-aperture 145a.

In the arrangement example of FIG. 11, the aperture 110a is disposed downstream of the through-aperture 145a in the conveyance direction A2. A position of the aperture 110a is displaced from a region 201 facing the sound aperture 142 provided for the microphone device 141.

Figure 12A:
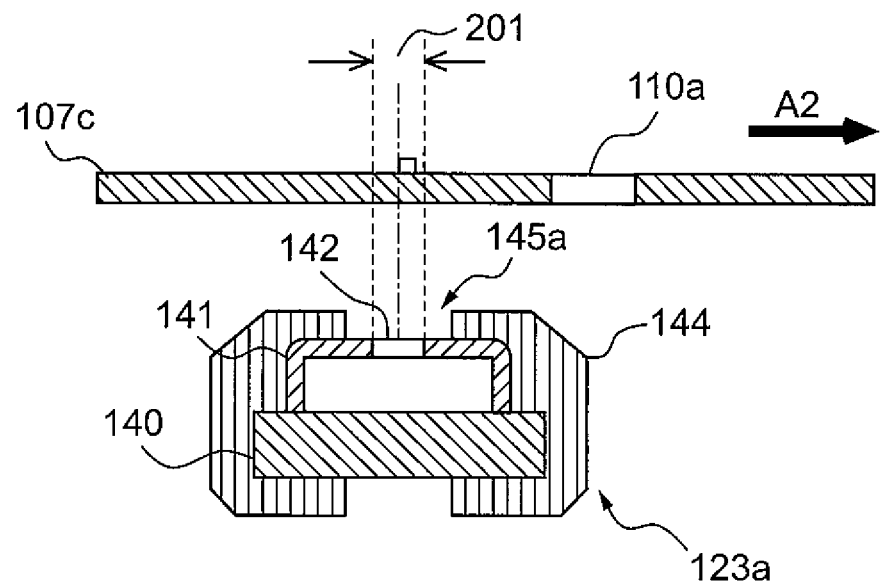
FIG. 12A is a view for illustrating a region facing a sound aperture 142.
Figure 12B:
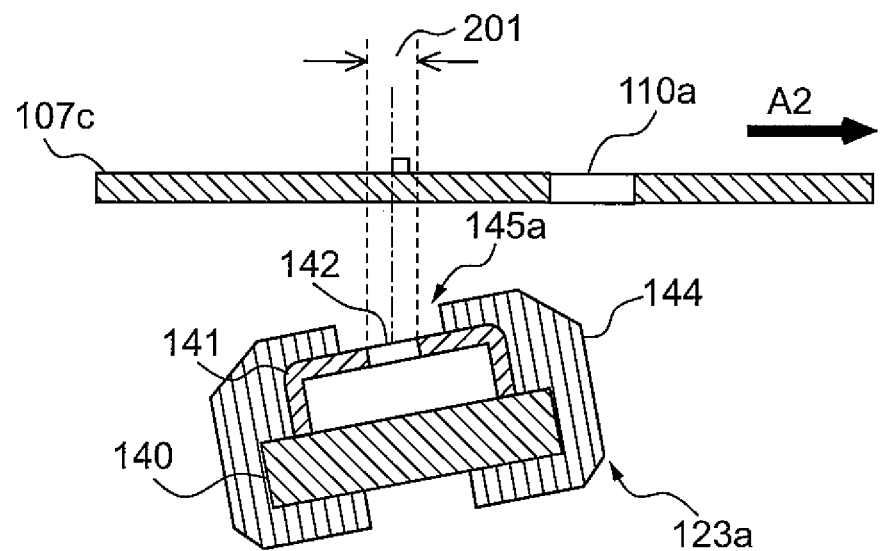
FIG. 12B is a view for illustrating a region facing the sound aperture 142.

FIG. 12A and FIG. 12B each are a view for illustrating the region 201 facing the sound aperture 142. The region 201 facing the sound aperture 142 refers to a region where the sound aperture 142 is projected vertically to the guide member 107c. In other words, the region 201 refers to a region surrounded by vertical feet each hanging to the guide member 107c from their respective points on the edge of the sound aperture 142.

Herein, in the example of FIG. 11, a distance between the apparatus center 200 illustrated by a dashed-dotted line and the aperture 110a and a distance between the apparatus center 200 and the region 201 are substantially the same. In other words, the positions of the aperture 110a and the region 201 in a sheet width direction 202 at right angles to the conveyance direction A2 are substantially the same.

Figure 13A:
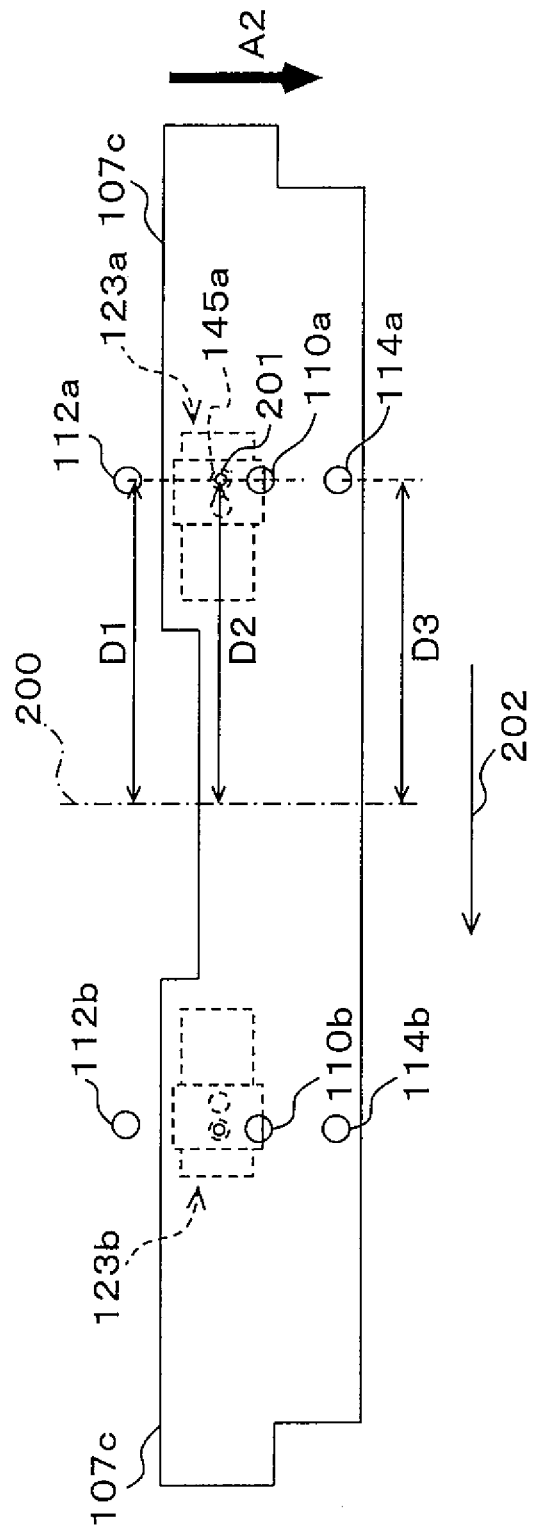

FIG. 13A is a view for illustrating one example of an arrangement position of the exhaust opening 114a. The arrangement position of the exhaust opening 114a will be described below, and the exhaust opening 114b is substantially the same as in this case. A distance D1 between the vent opening 112a and the apparatus center 200, a distance D2 between the through-aperture 145a and the apparatus center 200, and a distance D3 between the exhaust opening 114a and the apparatus center 200 may be substantially the same.

In other words, the positions of the vent opening 112a, the through-aperture 145a, and the exhaust opening 114a in the sheet width direction 202 at right angles to the conveyance direction A2 are substantially the same and are disposed substantially linearly. When the vent opening 112a, the through-aperture 145a, and the exhaust opening 114a are disposed substantially linearly, an air flow sent in from the vent opening 112a and exhausted from the exhaust opening 114a after blowing away foreign matter in the vicinity of the through-aperture 145a can be smoothed.

FIG. 13B is a view for illustrating another example of an arrangement position of the exhaust opening 114a. The distance D3 between the exhaust opening 114a and the apparatus center 200 may differ from the distance D1 between the vent opening 112a and the apparatus center 200 and the distance D2 between the through-aperture 145a and the apparatus center 200. For example, the exhaust opening 114a may be disposed outside a range R where a paper having a rated maximum width passes in the conveyance path when viewed from the apparatus center 200. When the exhaust opening 114a is disposed outside the range R where a conveyed paper passes, a jam caused by a paper edge caught by the exhaust opening 114a can be prevented.

Figure 14:
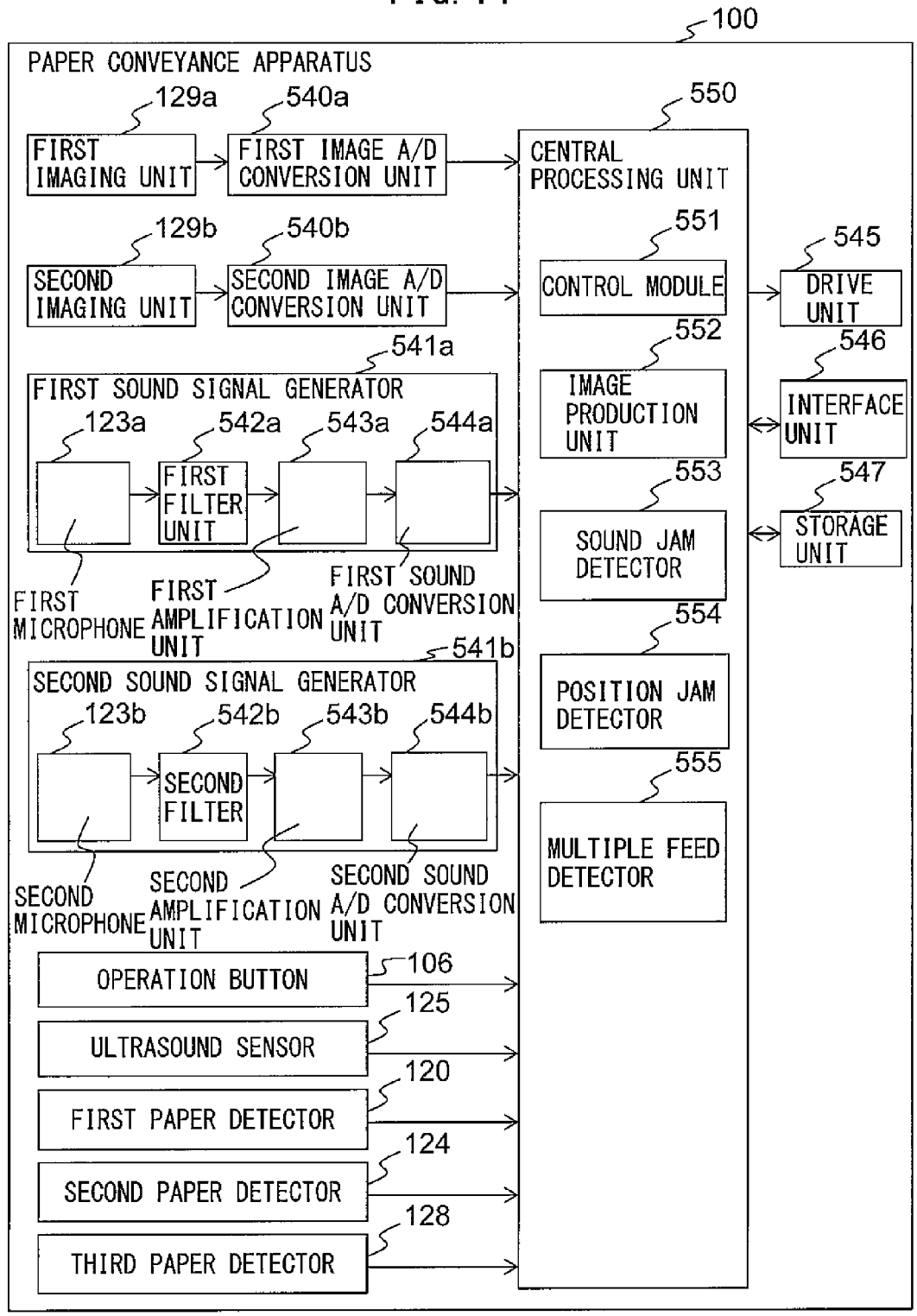
FIG. 14 is a block diagram illustrating a schematic configuration of the paper conveyance apparatus 100.

FIG. 14 is a block diagram illustrating a schematic configuration of the paper conveyance apparatus 100. In addition to the above-mentioned configuration, the paper conveyance apparatus 100 further includes such as a first image A/D conversion unit 540a, a second image A/D conversion unit 540b, a first sound signal generator 541a, a second sound signal generator 541b, a drive unit 545, an interface unit 546, a storage unit 547, and a central processing unit 550.

The first image A/D conversion unit 540a produces digital image data via analog/digital conversion of an analog image signal output from the first imaging unit 129a to be output to the central processing unit 550. In the same manner, the second image A/D conversion unit 540b produces digital image data via analog/digital conversion of an analog image signal output from the second imaging unit 129b to be output to the central processing unit 550. Hereinafter, each of the above-mentioned digital image data is referred to as a read image.

The first sound signal generator 541a includes such as a first microphone 123a, a first filter 542a, a first amplification unit 543a, and a first sound A/D conversion unit 544a. The first filter 542a applies a bandpass filter allowing a signal of a predetermined frequency band to pass through to a signal output from the first microphone 123a to be output to the first amplification unit 543a. The first amplification unit 543a amplifies a signal output from the first filter 542a to be output to the first sound A/D conversion unit 544a. The first sound A/D conversion unit 544a converts an analog signal output from the first amplification unit 543a to a first original signal, which is a digital signal, to be output to the central processing unit 550.

The second sound signal generator 541b includes such as a second microphone 123b, a second filter 542b, a second amplification unit 543b, and a second sound A/D conversion unit 544b. The second filter 542b applies a bandpass filter allowing a signal of a predetermined frequency band to pass through to a signal output from the second microphone 123b to be output to the second amplification unit 543b. The second amplification unit 543b amplifies a signal output from the second filter 542b to be output to the second sound A/D conversion unit 544b. The second sound A/D conversion unit 544b converts an analog signal output from the second amplification unit 543b to a second original signal, which is a digital signal, to be output to the central processing unit 550.

The drive unit 545 includes one or a plurality of motors, and rotates the sheet feeding roller 121, the retard roller 122, the first conveyance roller 126, and the second conveyance roller 130 based on a control signal from the central processing unit 550 to perform an conveyance operation of a paper.

The interface unit 546 has an interface circuit conforming to a serial bus such as USB and the like, and electrically connects to an information processing device, not illustrated, such as a personal computer and a mobile information terminal to transmit/receive a read image and various types of information. Further, the interface unit 546 may be connected to a flash memory and the like to store read images.

The storage unit 547 has a memory device such as a RAM (Random Access Memory) and a ROM (Read Only Memory), a fixed disk drive such as a hard disk drive, or a portable storage device such as a flexible disk and an optical disk. Further, the storage unit 547 stores such as a computer program, a data base, and a table for use in various types of processings of the paper conveyance apparatus 100. The computer program may be installed in the storage unit 547 from a computer-readable portable recording medium such as a CD-ROM (compact disk read only memory), a DVD-ROM (digital versatile disk read only memory), and the like, using a well-known setup program and the like. Further, the storage unit 547 stores read images.

The central processing unit 550 includes a CPU (Central Processing Unit) and operates based on a program previously stored in the storage unit 547. Herein, the central processing unit 550 may be configured using a DSP (digital signal processor), a LSI (large scale integration), an ASIC (Application Specific Integrated Circuit), a FPGA (Field-Programming Gate Array), or the like.

The central processing unit 550 is connected to the operation button 106, the first paper detector 120, the second paper detector 124, the ultrasound sensor 125, the third paper detector 128, the first imaging unit 129a, the second imaging unit 129b, the first image A/D conversion unit 540a, the second image A/D conversion unit 540b, the first sound signal generator 541a, the second sound signal generator 541b, the drive unit 545, the interface unit 546, and the storage unit 547 to control each of these units.

The central processing unit 550 executes a drive control of the drive unit 545 and a paper reading control of the imaging unit 129 to acquire a read image. Further, the central processing unit 550 includes such as a control module 551, an image production unit 552, a sound jam detector 553, a position jam detector 554, and an multiple feed detector 555. Each of these units is a functional module mounted by a software operated on a processor. Herein, these units each may be configured using such as an integrated circuit, a microprocessor, and a firmware independent of each other.

The sound jam detector 553 executes sound jam detection processing. In the sound jam detection processing, the sound jam detector 553 determines whether or not a jam has occurred based on the first original signal acquired from the first sound signal generator 541a and the second original signal acquired from the second sound signal generator 541b. Hereinafter, a jam in which the sound jam detector 553 determines whether or not the jam has occurred based on each original signal may also be referred to as a sound jam.

The position jam detector 554 executes position jam detection processing. In the position jam detection processing, the position jam detector 554 determines whether or not a jam has occurred based on a second paper detection signal acquired from the second paper detector 124 and a third paper detection signal acquired from the third paper detector 128. Hereinafter, a jam in which the position jam detector 554 determines whether or not the jam has occurred based on the second paper detection signal and the third paper detection signal may also be referred to as a position jam.

The multiple feed detector 555 executes multiple feed detection processing. In the multiple feed detection processing, the multiple feed detector 555 determines whether or not multiple feed of papers has occurred based on an ultrasound signal acquired from the ultrasound sensor 125.

The control module 551 determines whether or not an abnormality has occurred in paper conveyance processing. The control module 551 determines that an abnormality has occurred in the case of occurrence of at least one of a sound jam, a position jam, and multiple feed of papers. In the case of occurrence of an abnormality in the paper conveyance processing, the control module 551 sets an abnormality occurrence flag to ON.

In the case of ON of the abnormality occurrence flag, the control module 551 stops the drive unit 545 as abnormal processing to stop the conveyance of a paper, at the same time, notifies the user of the occurrence of an abnormality using a speaker or a LED (Light Emitting Diode), not illustrated, and sets the abnormality occurrence flag to OFF.

When the abnormality occurrence flag is not set to ON, the image production unit 552 causes the first imaging unit 129*a* and the second imaging unit 129*b* to read a conveyed paper to acquire a read image via the first image A/D conversion unit 540*a* and the second image A/D conversion unit 540*b*, respectively. The central processing unit 550 transmits an acquired read image to an information processing unit, not illustrated, via the interface unit 546. Herein, in the case of no connection to the information processing unit, the central processing unit 550 stores the acquired read image in the storage unit 547.

According to the present example, a vent opening, that communicates with the interior and exterior of the space 109 where the first microphone 123*a* and the second microphone 123*b* are disposed, is provided. This makes it easy to blow away foreign matters adhering to a vicinity of the first microphone 123*a* and the second microphone 123*b* by sending an air blow into the space 109 at the time of cleaning. Therefore, adhesion of foreign matter to and intrusion thereof into the first microphone 123*a* and the second microphone 123*b* are reduced.

When the vent path 111*a* is disposed in an upstream of the sound aperture 142 and the through-aperture 145*a* of the first microphone 123*a* and the second microphone 123*b*, foreign matter having been blown away from the sound aperture 142 and the through-aperture 145*a* flow downstream. Foreign materials inside the space 109 are likely to flow downstream with conveyance of a paper, and therefore become unlikely to re-adhere to the sound aperture 142 and the trough-aperture 145*a*.

When the exhaust opening 114*a* is disposed in a downstream of the sound aperture 142 and the trough-aperture 145*a*, foreign matter having been blown away from the sound aperture 142 and the through-aperture 145*a* are easily discharged from the space 109. When the exhaust opening 114*a* is disposed in a downstream of the aperture 110*a*, foreign matter being deposited on the aperture 110*a* are also easily discharged from the exhaust opening 114*a*.

According to embodiments illustrated herein, adhesion of foreign matter to and intrusion thereof into a sound receiving aperture where a sound generated in a conveyance path is detected, are reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A paper conveyance apparatus comprising:
   a housing;
   a guide member for guiding a paper conveyed in a paper conveyance path, the guide member being attached to the housing;
   a sound signal generator for generating a sound signal in response to a sound detected through a sound receiving member disposed in a space between the housing and the guide member;
   an aperture, provided in the guide member, for introducing the sound generated in the paper conveyance path to the sound receiving member;
   a vent path for cleaning the sound receiving member by an air blow to the sound receiving member, the vent path communicating with the interior and exterior of the space between the housing and the guide member; and
   an exhaust opening, provided in the guide member, for exhausting an air blow introduced from the vent path, wherein the aperture is utilized as the exhaust opening.

2. The paper conveyance apparatus according to claim 1, wherein the vent path is disposed upstream of the sound receiving member in the paper conveyance path.

3. The paper conveyance apparatus according to claim 1, wherein
   the exhaust opening being disposed downstream of the sound receiving member in the paper conveyance path.

4. The paper conveyance apparatus according to claim 3, wherein the exhaust opening is disposed outside of a region where the paper is conveyed in the paper conveyance path.

5. The paper conveyance apparatus according to claim 3, comprising a blow regulator directing a direction of the air blow introduced from the vent path toward the exhaust opening.

6. The paper conveyance apparatus according to claim 3, wherein
   the aperture is disposed downstream of a position facing the sound receiving member in the guide member in the paper conveyance path.

7. The paper conveyance apparatus according to claim 1, wherein a vent opening communicating with the vent path is disposed in an outer face of the housing.

* * * * *